Patented Aug. 12, 1952

2,606,868

UNITED STATES PATENT OFFICE 2,606,868

PHOTOCHEMICAL PREPARATION OF THE DELTA ISOMER OF BENZENE HEXACHLORIDE

Francis N. Alquist and Kenneth C. Kauer, Midland, Mich., assignors to The Dow Chemical Company, Midland, Mich., a corporation of Delaware No Drawing. Application May 31, 1951, Serial No. 229,268

5 Claims. (Cl. 204—163)

This invention relates to a method for the preparation of 1,2,3,4,5,6-hexachlorocyclohexane, also known as benzene hexachloride ($C_6H_6Cl_6$). It relates in particular to a method whereby the herbicidally active delta isomer of benzene hexachloride is produced in much higher proportion in the crude reaction product than by the conventional methods of manufacture.

The conventional photochlorination of benzene yields a mixture of isomeric benzene hexachlorides in which the delta isomer is present in amounts of 6 to 14 per cent. Several methods are known for treating the crude mixture of isomers to obtain therefrom a fraction relatively rich in the delta isomer. Even if such treatment were to result in isolation of all the delta isomer, which is seldom possible, it would be preferable and more economical to be able to apply the treatment to an isomeric mixture having an initial delta isomer content considerably higher than the heretofore customary 6 to 14 per cent. Even when herbicidal compositions are prepared by diluting a mixture of the isomers with inert carriers it would be more economical to be able to add a cheap carrier to a product initially rich in the delta isomer than to one initially containing less of that active herbicide.

It is accordingly the principal object of the present invention to provide a method for the chlorination of benzene by addition whereby there may be obtained directly a mixture of benzene hexachloride isomers significantly richer in the delta isomer than is the product obtained by the simple photochlorination of benzene. Specificallly, it is an object of the invention to provide a method for chlorinating benzene to obtain an isomeric mixture of benzene hexachlorides containing consistently over 17 per cent of the delta isomer.

In accordance with the present invention, the foregoing objects are attained, and the said desired ratio of delta benzene hexachloride to the other isomers is realized, through a process which consists essentially in the photochlorination of benzene, at a temperature between 0° C. and −30° C., while the benzene is dissolved in a solvent selected from the group consisting of chlorinated methanes and liquid chlorinated ethanes in a ratio to provide from 10 to 96 per cent of the chlorinated solvent and correspondingly 90 to 4 per cent benzene in the presence of catalytic amounts of a member of the group consisting of benzothiazole and mercaptobenzothiazole. Under preferred conditions of operation, the amount of the chlorinated solvent is from 5 to 30 times the weight of benzene to be chlorinated.

While numerous other aliphatic polyhalogen compounds have been tried as reaction media in the presence of the benzothiazole compounds, the chlorinated methanes and liquid chlorinated ethanes are preferred for their ability to aid in the production of a mixed benzene hexachloride product rich in the desired delta isomer. Methyl chloride, methylene chloride, chloroform and ethylene chloride are examples of solvents which are especially effective in the present invention. A benzene hexachloride rich in the delta isomer has proven surprisingly useful as a herbicide, especially as a control agent for aquatic vegetation.

The benzene need not be anhydrous, and the presence of small amounts of water, not over about 1 per cent, and preferably 0.1 per cent or less, is desirable. The internal surface of the apparatus employed must be free from catalytically active forms of metals which induce the chlorination of benzene by substitution, and active substitution chlorination catalysts should be kept out of the reaction medium. For best results, the chlorine employed should be substantially free from oxygen, and there are indications that the reaction proceeds much more satisfactorily when the benzene and halogenated hydrocarbon have been freed from dissolved oxygen. Hence, it is desirable, though not necessary, to remove air from the apparatus to facilitate the reaction. Most of these precautions have been found applicable and desirable in other modes of preparation of benzene hexachloride as well as in the one here described, so the principal requirement may be considered to be the avoidance of materials which prevent the addition chlorination of benzene.

Any reaction vessel may be use in which the solution of benzene and the benzothiazole compound in the chlorinated solvent may be exposed to actinic light while being subjected to the action of gaseous, liquid, or dissolved chlorine. The vessel may be made of, or have internal surfaces of nickel, copper, lead, ceramics, glass or other materials which neither catalyze the substitution chlorination of benzene nor inhibit its chlorination by addition. The shape and construction of the reaction vessel do not form part of the present invention.

The following examples illustrate the practice of the invention:

*Example 1*

In a series of similar experiments carried out in accordance with the present invention, a weighed amount of benzene was dissolved in about 20 times its weight of methylene chloride and to this was added a catalytic portion (about 0.03-0.04 times the weight of benzene) of benzothiazole. The mixture was introduced into a reactor equipped with a glass cooling coil and was irradiated with a mercury arc lamp. Chlorine was introduced into the benzene-containing liquid and the reaction proceeded smoothly at temperatures of about −19° to −24° C. About 2.9 moles of chlorine were introduced for each mole of benzene. After the chlorine has reacted, the volatile solvent was removed from the reaction mixture and benzene hexachloride was recovered therefrom. In all cases, commercially acceptable yields of benzene hexachloride were obtained. Each product contained about 21 per cent of the delta isomer, as analyzed by the standard infra-red method.

*Example 2*

A second series of experiments were carried out as in Example 1, using the same proportions of reactants but substituting mercaptobenzothiazole for benzothiazole. A satisfactory yield of benzene hexachloride was obtained in each case. Each product contained about 18 to 19 per cent of the delta-isomer, as analyzed by the standard infra-red method.

*Example 3*

A third series of experiments was carried out as in Example 1, using the same proportions of reactants but substituting methyl chloride for methylene chloride. A satisfactory yield of benzene hexachloride was obtained in each case. Each product contained about 20 to 21 per cent of the delta-isomer, as analyzed by the standard infra-red method.

*Example 4*

In another series of similar runs, using the same proportions of reactants as in Example 1, but substituting chloroform for methylene chloride, a satisfactory yield of benzene hexachloride was obtained in each case. When benzothiazole was used as the activator, each product contained about 21 to 25 per cent of the delta-isomer, as analyzed by the standard infra-red method. A complete analysis of one such product is:

| | Per cent |
|---|---|
| Isomer Alpha | 50.2 |
| Beta | 11.0 |
| Gamma | 13.1 |
| Delta | 25.3 |
| Epsilon | 0.4 |

We claim:

1. The method which consists essentially in the photo-chlorination of benzene at a temperature of between 0° C. and −30° C. while the benzene is dissolved in a solvent selected from the group consisting of chlorinated methanes and liquid chlorinated ethanes in a ratio to provide from 10 to 96 per cent of the chlorinated solvent and correspondingly 90 to 4 per cent benzene, in the presence of catalytic amounts of a member selected from the group consisting of benzothiazole and mercaptobenzothiazole, and recovering from the reaction medium an isomeric mixture of benzene hexachlorides containing over 17 per cent of the delta isomer.

2. The method as claimed in claim 1 wherein the catalyst employed is benzothiazole.

3. The method as claimed in claim 1 wherein the catalyst employed is mercaptobenzothiazole.

4. The method as claimed in claim 1 wherein the solvent employed is chloroform.

5. The method as claimed in claim 1 wherein the solvent employed is methylene chloride.

FRANCIS N. ALQUIST.
KENNETH C. KAUER.

REFERENCES CITED

The following references are of record in the file of this patent:

UNITED STATES PATENTS

| Number | Name | Date |
|---|---|---|
| 2,513,092 | Gonze | June 27, 1950 |
| 2,555,889 | Kilka et al. | June 5, 1951 |

FOREIGN PATENTS

| Number | Country | Date |
|---|---|---|
| 607,326 | Great Britain | Aug. 30, 1948 |